(12) United States Patent
Kato et al.

(10) Patent No.: US 8,023,748 B2
(45) Date of Patent: Sep. 20, 2011

(54) IMAGE CAPTURING APPARATUS, IMAGING CIRCUIT, AND IMAGE CAPTURING METHOD

(75) Inventors: Fumiaki Kato, Chiba (JP); Ken Nakajima, Tokyo (JP)

(73) Assignee: Sony Corporation (JP)

( * ) Notice: Subject to any disclaimer, the term of this patent is extended or adjusted under 35 U.S.C. 154(b) by 995 days.

(21) Appl. No.: 11/710,622

(22) Filed: Feb. 23, 2007

(65) Prior Publication Data

US 2007/0223824 A1   Sep. 27, 2007

(30) Foreign Application Priority Data

Feb. 27, 2006   (JP) ................ P2006-050170

(51) Int. Cl.
 *G06K 9/36*   (2006.01)
(52) U.S. Cl. ........ 382/232; 382/242; 382/245; 382/246; 382/244; 382/251; 385/135; 385/133; 385/136; 385/138; 385/240
(58) Field of Classification Search ................ 382/232, 382/242, 245, 246; 358/135, 133, 136, 138
See application file for complete search history.

(56) References Cited

U.S. PATENT DOCUMENTS

| | | | | | |
|---|---|---|---|---|---|
| 4,890,161 | A | * | 12/1989 | Kondo ............... | 375/240.24 |
| 5,182,636 | A | * | 1/1993 | Kikuchi et al. ......... | 348/225.1 |
| 5,258,835 | A | * | 11/1993 | Kato ............... | 375/240.12 |
| 5,444,487 | A | * | 8/1995 | Kondo et al. ......... | 375/240.03 |
| 5,734,433 | A | * | 3/1998 | Kondo et al. ......... | 375/240.24 |
| 5,878,168 | A | * | 3/1999 | Kondo et al. .......... | 382/232 |
| 6,058,217 | A | * | 5/2000 | Kondo ............... | 382/251 |
| 6,295,008 | B1 | * | 9/2001 | Kondo et al. ......... | 341/50 |
| 6,404,927 | B1 | * | 6/2002 | Li et al. ............ | 382/232 |
| 7,009,533 | B1 | * | 3/2006 | Wegener ............ | 341/76 |
| 7,224,838 | B2 | * | 5/2007 | Kondo et al. ......... | 382/232 |
| 2003/0223490 | A1 | * | 12/2003 | Kondo et al. ......... | 375/240 |

FOREIGN PATENT DOCUMENTS

| | | |
|---|---|---|
| EP | 0 731 616 | 9/1996 |
| EP | 0 907 294 | 4/1999 |
| EP | 907294 | * 4/1999 |
| EP | 1 073 279 | 1/2001 |
| JP | 2003-125209 A | 4/2003 |
| JP | 2004-040300 A | 2/2004 |
| JP | 2005086226 A | 3/2005 |
| WO | 90/02465 | 3/1990 |

OTHER PUBLICATIONS

Office Action from Japanese Application No. 2006-050170, dated Feb. 2, 2010.

* cited by examiner

*Primary Examiner* — Brian Q Le
*Assistant Examiner* — Mek Bekele
(74) *Attorney, Agent, or Firm* — Lerner, David, Littenberg, Krumholz & Mentlik, LLP

(57) ABSTRACT

An image capturing apparatus for capturing an image with solid state imaging devices may include a compressing section, a memory, a decompressing section, and a signal processing section. The compressing section may compress digitalized data of an image captured with the solid state imaging devices. The memory may temporarily store the compressed image data that is compressed by the compressing section. The decompressing section may decompress the compressed image data that is read out from the memory. The signal processing section may perform an image quality correction operation on the image data decompressed by the decompressing section. The compressed image data may contain a maximum value and a minimum value of pixel data in a block, information regarding positions of the maximum value and the minimum value in the block, and quantized data.

18 Claims, 11 Drawing Sheets

IMAGE CAPTURING APPARATUS, IMAGING CIRCUIT, AND IMAGE CAPTURING METHOD

CROSS-REFERENCE TO RELATED APPLICATIONS

This application claims priority from Japanese Patent Application No. JP 2006-050170 filed in the Japanese Patent Office on Feb. 27, 2006, the entire content of which is incorporated herein by reference.

BACKGROUND OF THE INVENTION

1. Field of the Invention

The present invention relates to image capturing apparatuses, imaging circuits, and image capturing methods for capturing images with solid state imaging devices. In particular, the present invention relates to an image capturing apparatus that temporarily stores image signals resulting from an image capturing operation and processes the image signals, an imaging circuit suitable for such a configuration, and an image capturing method.

2. Description of the Related Art

Recently, the use of imaging capturing apparatuses, such as digital still cameras and digital video cameras, capable of capturing images with solid state imaging devices and of storing the captured images as digital data has been widespread. In such an image capturing apparatus, the number of pixels of imaging devices is increasing, the functions of the apparatus are more advanced, and the performance of the apparatus is becoming higher. In particular, an increase in the number of pixels of imaging devices leads to an increase in a load for processing imaging signals. It is desired that even such an image capturing apparatus can process the imaging signals at high speed so as not to put a stress on operations.

FIG. 11 is a block diagram showing an example of a configuration of a known image capturing apparatus.

The known image capturing apparatus shown in FIG. 11 has imaging devices 81, an AFE (analog front end) circuit 82, a digital image processing circuit 83, an SDRAM (synchronous dynamic random access memory) 84, a ROM (read only memory) 85, and a storage device 86. In addition, the digital image processing circuit 83 includes a camera signal preprocessing section 91, a camera signal processing section 92, a resolution converting section 93, a JPEG (joint photographic experts group) engine 94, a CPU (central processing unit) 95, a video output encoder 96, and an SDRAM controller 97, which are connected to each other through an internal bus 98.

In the image capturing apparatus having such a configuration, imaging signals of an image captured by the imaging devices 81 are sequentially supplied to the AFE circuit 82. After undergoing a CDS (correlated double sampling) operation and an AGC (auto gain control) operation, the imaging signals are digitalized and supplied to the digital image processing circuit 83. The camera signal preprocessing section 91 performs operations, such as defect pixel correction and shading correction, on the supplied image signal to generates RAW data, and writes the RAW data in the SDRAM 84 through the SDRAM controller 97.

The camera signal processing section 92 reads out the RAW data from the SDRAM 84 through the SDRAM controller 97. After performing the various detection operations and an image quality correction operation (i.e., camera signal processing operations) on the RAW data, the camera signal processing section 92 converts the RAW data into a luminance signal (Y) and color-difference signals (R-Y and B-Y), and outputs the luminance signal and the color-difference signals. The resolution converting section 93 converts the resolution of the image data output from the camera signal processing section 92, if necessary.

The video output encoder 96 converts the image data, whose resolution has been converted into a resolution suitable for displaying by the resolution converting section 93, into an image signal for displaying an image on a monitor, and outputs the converted image signal to a monitor (not shown) or a video output terminal 96a. This allows a camera-through image to be displayed. The JPEG engine 94 compresses and encodes the image data supplied from the camera signal processing section 92 or the resolution converting section 93 according to a JPEG standard, and temporarily stores the encoded image data in the SDRAM 84. The CPU 95 records the JPEG encoded data stored in the SDRAM 84 on the storage device 86.

The CPU 95 controls operations performed in the entire image capturing apparatus in an integrated manner. The ROM 85 stores programs executed by the CPU 95 and data necessary for the operations.

In the above, the image capturing apparatus that records captured images as JPEG data has been described. However, an image capturing apparatus having a function to directly record RAW data, not having undergone the camera signal processing operations, on a recording medium is also realized. For example, there is an image capturing apparatus that has a function to compress RAW data according to a reversible compression method that utilizes a Huffman table and to record the compressed data, and that optimizes the Huffman table for each color channel (for example, see Japanese Unexamined Patent Application Publication No. 2004-40300 (Paragraph Nos. [0019] to [0028], FIG. 2)). In addition, there is also an image capturing apparatus that bypasses an RAW data interpolation processing section used in a normal compression mode when the mode is set in a RAW compression mode for compressing and recording RAW data (for example, see Japanese Unexamined Patent Application Publication No. 2003-125209 (Paragraph Nos. [0027] to [0037], FIG. 1)).

As shown in FIG. 11, a general image capturing apparatus temporarily stores RAW data obtained from imaging devices in an image memory such as an SDRAM, and then reads out the RAW data and performs a camera signal processing operation on the read out RAW data. For example, in a case where an apparatus completes capturing of a frame with a plurality fields, such as a case where the apparatus uses interlaced scanning imaging devices, frame data is generated after data of each field is stored in a memory. In addition, an apparatus may have a processing system that partially processes data (for example, several lines in a vertical direction in a rectangular shape) of a entire screen image using only a delay line equivalent to a fraction of 1H (horizontal synchronization interval) to suppress the size of a line memory included in the camera signal processing section. In such a case, it is also necessary to store the data for the entire screen image in the memory at least before the processing.

When RAW data is written in and read out from a memory, the data for the entire screen image is transferred over an interval bus. Thus, most of the bus band used at the time of image capturing is occupied by this transfer. In particular, as the number of pixels of imaging devices and the size of the RAW data increase, a data transfer load increases, which undesirably requires a longer time for writing and reading out data in and from a memory. Accordingly, an attempt to decrease an amount of time for a recording operation requires an increase in the bus band by setting a transmission frequency higher or the like, which undesirably increases a cost of the apparatus. Additionally, an increase in the number of pixels undesirably leads to an increase in a capacity of a memory storing the RAW data.

On the other hand, it is also considered to compress RAW data before transferring the RAW data over the internal bus. If a variable-length coding method is employed as the compression method, a bus band necessary for the transfer may not be kept constant, which undesirably complicates the processing and prevents an advantage of reducing the bus band from being provided.

In the above-cited Japanese Unexamined Patent Application Publication No. 2004-40300, the RAW data is compressed according a variable-length coding method. In addition, in both the above-cited Japanese Unexamined Patent Application Publication Nos. 2004-40300 and 2003-125209, the RAW data is not compressed to reduce the internal bus band.

SUMMARY OF THE INVENTION

Embodiments of the present invention are made in view of such disadvantages. It is desirable to provide an image capturing apparatus allowing a high-speed image capturing operation by reducing the time for reading and writing image data from and in an internal memory.

In addition, it is also desirable to provide an imaging circuit allowing a high-speed image capturing operation by reducing the time for reading and writing image data from and in an internal memory.

Furthermore, it is desired to provide an image capturing method allowing a high-speed image capturing operation by reducing the time for reading and writing image data from and in an internal memory.

To this end, according to an embodiment of the present invention, an image capturing apparatus for capturing an image with solid state imaging devices is provided. The image capturing apparatus may include a compressing section for compressing digitalized data of an image captured with the solid state imaging devices, a memory for temporarily storing the compressed image data that is compressed by the compressing section, a decompressing section for decompressing the compressed image data that is read out from the memory, and a signal processing section for performing an image quality correction operation on the image data decompressed by the decompressing section. The compressing section may generate the compressed image data that contains a maximum value and a minimum value of the pixel data in a block constituted by the pixel data from a predetermined number of pixels, information regarding positions where the maximum value and the minimum value are located in the block, and quantized data obtained by subtracting the minimum value from each pixel data value except for the maximum value and the minimum value in the block and then quantizing the results of the subtraction.

In such an image capturing apparatus, the digitalized data of the image captured with the solid state imaging devices may be compressed by the compressing section. The compressed image data may be temporarily stored in the memory. The decompressing section may then decompresses the compressed image data read out from the memory. The signal processing section performs the image quality correction operation on the decompressed image data. Here, the compressed image data generated by the compressing section may contain the maximum and minimum values of pixel data in the block constituted by pixel data from a predetermined number of pixels, the information regarding positions of the maximum and minimum values in the block, and the quantized data. The quantized data may be obtained by subtracting the minimum value from each pixel data value except for the maximum value and the minimum value in the block and then quantizing the results of the subtraction.

In the image capturing apparatus according to the embodiments of the present invention, the image data to be read out from and write in the memory may be compressed in a procedure before the signal processing section performs the image quality correction operation on the captured image data. Thus, the time for reading and writing the image data from and in the memory is reduced. In addition, the compressed image data to be temporarily stored in the memory may be obtained by detecting the maximum and minimum values of the pixel data in block and the position thereof in the block and then quantizing the results of subtracting the minimum value from each value of the pixel data in the block. Thus, the input image data can be compressed by simply and easily processing the input image data in an integrated fashion. Furthermore, since the constant word length employed in the quantization of the data allows a fixed length compression encoding, the reading out and writing of the compressed image data from and in the memory are controlled more easily. Thus, the entire processing load and the data transfer load are reduced, which allows the high-speed image capturing operations.

DETAILED DESCRIPTION

Embodiments of the present invention will be described in detail below with reference to the accompanying drawings.

First Embodiment

Figure 1:
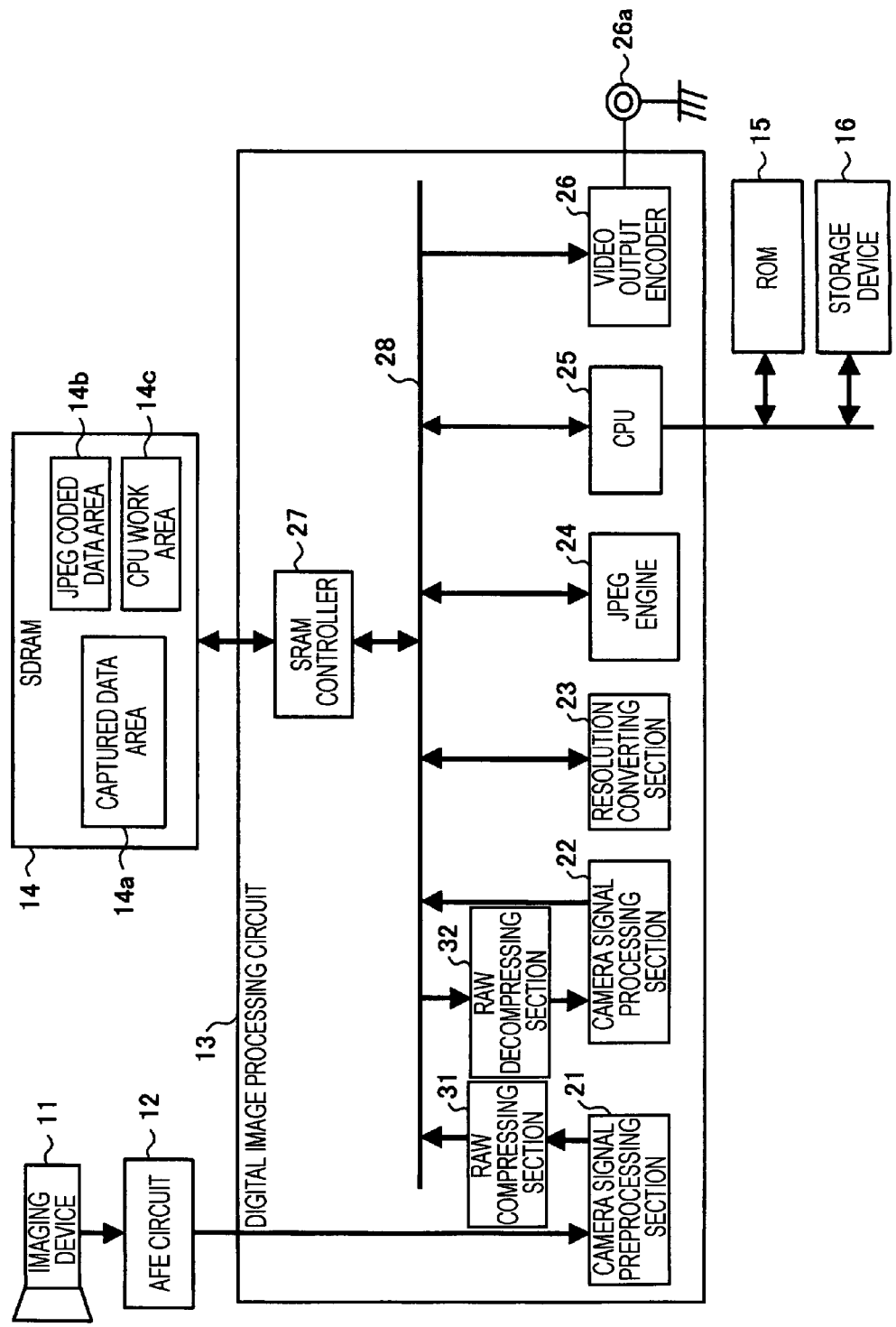
FIG. 1 is a block diagram showing a configuration of an image capturing apparatus according to a first embodiment of the present invention.

FIG. 1 is a block diagram showing a configuration of an image capturing apparatus according to a first embodiment of the present invention.

An image capturing apparatus shown in FIG. 1 has imaging devices 11, an AFE (analog front end) circuit 12, a digital image processing circuit 13, an SDRAM (synchronous dynamic random access memory) 14, a ROM (read only memory) 15, and a storage device 16. In addition, the digital image processing circuit 13 includes a camera signal preprocessing section 21, a camera signal processing section 22, a resolution converting section 23, a JPEG (joint photographic experts group) engine 24, a CPU (central processing unit) 25, a video output encoder 26, and an SDRAM controller 27, which are connected to each other through an internal bus 28. Furthermore, in addition to those known configurations, the digital image processing circuit 13 according to the embodiment includes an RAW compressing section 31 and an RAW decompressing section 32.

The imaging devices 11 are solid state imaging devices such as, for example, CCD (charge coupled device) image sensors or CMOS (complementary metal oxide semiconductor) image sensors. The imaging devices 11 convert an incident light from a subject through a lens block (not shown) into electric signals.

The AFE circuit 12 samples and holds signals by a CDS (correlated double sampling) operation so as to keep an S/N (signal to noise) ratio at a high level. The AFE circuit 12 also controls gain by an AGC (auto gain control) operation. The AFE circuit 12 outputs a digital image signal after performing A/D (analog to digital) conversion.

The digital image processing circuit 13 may be formed as, for example, a SoC (system on a chip) circuit. In the digital image processing circuit 13, the camera signal preprocessing section 21 performs a signal correction operation of a defect pixel of the imaging devices 11 and a shading operation for correcting a drop in peripheral light quantity caused by a lens on the image signal supplied from the AFE circuit 12. The camera signal preprocessing section 21 then outputs the processed signal as RAW data.

The RAW compressing section 31 compresses the RAW data supplied from the camera signal preprocessing section 21 using a compression method described below, and supplies the compressed data to the SDRAM 14 through the SDRAM controller 27.

The RAW decompressing section 32 decompresses the compressed RAW data read out from the SDRAM 14 through the SDRAM controller 27 using a method describe below, and outputs the decompressed data to the camera signal processing section 22.

After performing demosaicing processing on the RAW data supplied from the RAW decompressing section 32, the camera signal processing section 22 performs at least some of so-called camera signal processing operations. More specifically, the camera signal processing section 22 performs signal detection processing for AF (auto focus) control, AE (auto exposure) control, and white balance control and signal correction processing represented by white balance adjustment. Furthermore, the camera signal processing section 22 converts the signal-corrected image data into a luminance signal (Y) and color-difference signals (R-Y and B-Y) according to a predetermined format of, for example, 4:2:2.

In response to the input of the image data processed by the camera signal processing section 22 or the input of the image data decompressed and decoded by the JPEG engine 24, the resolution converting section 23 converts the resolution of the image data into a predetermined resolution.

The JPEG engine 24 compresses and encodes the image data processed by the resolution converting section 23 to generate encoded data according to the JPEG format. In addition, the JPEG engine 24 decompresses and decodes JPEG image data read out from the storage device 16. The digital image processing circuit 13 may include an encode/decode engine for another still image compression method or another movie compression method other than the JPEG engine 24.

The CPU 25 controls the digital image processing circuit 13 and the entire image capturing apparatus by executing programs stored in the ROM 15 in an integrated fashion. The CPU also executes various arithmetic operations for the control operations.

The video output encoder 26 may be, for example, an NTSC (national television standards committee) encoder. The video output encoder 26 generates image signals for monitor displaying from the image data output from the resolution converting section 23 or the like, and outputs the image signals to a monitor (not shown) or a video output terminal 26a.

The SDRAM controller 27 is an interface block to the SDRAM 14, and includes an address decoder. According to the control signals supplied from the CPU 25, the SDRAM controller 27 controls writing and reading operations in and from the SDRAM 14.

The SDRAM 14 is a volatile memory prepared as a work area used by the digital image processing circuit 13 to perform data processing. The SDRAM 14 has a captured data area 14a, a JPEG coded data area 14b, and a CPU work area 14c. The captured data area 14a temporarily stores the data of the image captured by the imaging devices 11, i.e., the RAW data compressed by the RAW compressing section 31. The JPEG coded data area 14b temporarily stores the image data encoded by the JPEG engine 24 and the data utilized in the encoding/decoding operations. The CPU work area 14c temporarily stores data utilized in the operations performed by the CPU 25.

The ROM 15 stores the programs executed by the CPU 25 and various data. A nonvolatile memory such as, for example, an EEPROM (electronically erasable and programmable ROM) and a flash memory may be used as the ROM 15.

The storage device 16 is a device for recording files of encoded image data. The storage device 16 is constituted by a recording medium, such as a flash memory, an optical disc, and a magnetic tape, and a record/playback drive therefor.

In the image capturing apparatus having the above-described configuration, imaging signals of an image captured by the imaging devices 11 are sequentially supplied to the AFE circuit 12. After undergoing the CDS operation and the AGC operation, the imaging signals are digitalized and supplied to the camera signal preprocessing section 21 of the digital image processing circuit 13. The camera signal preprocessing section 21 performs operations, such as defect pixel correction and shading correction, on the supplied image signal to generate the RAW data. After being compressed by the RAW compressing section 31, the RAW data is temporarily written in the SDRAM 14.

After reading out the RAW data from the SDRAM 14, the RAW decompressing section 32 decompresses the RAW data. The camera signal processing section 22 then performs various image quality correction operations. After the processed image data is temporarily stored in, for example, the SDRAM 14, the resolution converting section 23 converts the resolution of the image data into a resolution suitable for displaying. The resolution-converted image data is further stored in, for example, the SDRAM 14, and supplied to the video output encoder 26. Accordingly, a camera-through image is displayed on a monitor.

In addition, in response to a request for recording an image given through an input section (not shown), the resolution converting section 23 converts the resolution of the image data processed by the camera signal processing section 22 into a resolution set for recording if necessary, and temporarily stores the resolution-converted image data in, for example, the SDRAM 14. The JPEG engine 24 compresses and encodes the image data to generate the encoded data. After being temporarily stored in, for example, the SDRAM 14, the encoded data is recorded on the storage device 16.

In addition, after the image data (encoded data) recorded on the storage device 16 is decompressed and decoded by the JPEG engine 24 and the resolution of the image data is converted by the resolution converting section 23, the image data is output to the video output encoder 26, whereby the image can be displayed on the monitor.

In the above-described digital image processing circuit 13, the RAW compressing section 31 for compressing the RAW data is provided at an upstream position of a part where the image data is input to the internal bus 28 from the camera signal preprocessing section 21. This allows the data amount of the RAW data to be transferred to the SDRAM 14 through the internal bus 28 to be reduced. In addition, the RAW decompressing section 32 for decompressing the RAW data is provided at an upstream position of a part where the image data is supplied to the camera signal processing section 22 from the internal bus 28. Similarly, this allows the data amount of the RAW data to be transferred to the camera signal processing section 22 from the SDRAM 14 to be reduced.

With the above-described configuration, a transfer load of the internal bus 28 during the image capturing operation can be reduced and the time for the writing and reading operations in and from the SDRAM 14 can be decreased. In particular, by simplifying the compression/decompression operations as much as possible, the effect of reducing the processing time can be increased. In addition, power consumption can be also suppressed by decreasing a transmission frequency over the bus.

Furthermore, the capacity of the SDRAM 14 can be decreased. Alternatively, an area in the SDRAM 14 may be utilized for other processing operations, and the number of continuously shootable images may be increased or the continuous shooting speed may be improved by storing the RAW data for a plurality of frames, which can contribute to an increase in image quality and an advance of functions. Therefore, a highly functional and small image capturing apparatus that requires less time for image capturing and data recording can be realized at a low cost.

In addition, by using a reversible compression method in the compression operation performed on the RAW data by the RAW compressing section 31, the quality of the RAW data can be maintained. The quality of the RAW data compressed even using an irreversible compression method is also allowable as long as an amount of compression distortion after the RAW data is converted into the luminance/color-difference signals is not sensible by the human eye. Generally, if a PSNR (peak signal to noise ratio) after the RAW data is converted into the luminance/color-difference signals is within a range of 50 dB to 40 dB, the level of the compression distortion is allowable.

Furthermore, if the RAW data can be encoded at a fixed length at the time of compression, the band for the RAW data to be read and written from and in the SDRAM 14 can be kept constant, which allows the transfer load on the internal bus 28 to be reduced in a stable manner. In addition, the manner of handling the RAW data in the camera signal processing section 22 (e.g., a data read control operation from the SDRAM 14) and a RAW data transfer control operation through the internal bus 28 can be simplified.

For example, when reading out the compressed RAW data that is encoded at a variable length from the SDRAM 14, burst accesses are often required. In addition, the camera signal processing section 22 may have a function to partially process data (for example, in a rectangular shape in a vertical direction) of an entire screen image with a delay line equivalent to a fraction of 1H (horizontal synchronization interval). In such a case, by encoding the RAW data at a fixed length, addresses of the RAW data stored at any location on the SDRAM 14 is calculated more easily and the RAW data is read out. It is also possible to access the SDRAM 14 through a DMA (direct memory access) controller included in the digital image processing circuit 13.

Thus, as described below, an irreversible compression/decompression method that allows fixed-length encoding, that can keep the image quality at a high level, and that realizes the compression/decompression with a relatively easy processing operation is employed in this embodiment.

In a following example, the size of a RAW data signal is set at 14 bits for each pixel, and a quantization word length is fixed at 7 bits. Data from 16 pixels of the same color component arranged in the horizontal direction is converted into encoded data for one block. In addition, for example, 14-bit data occupies an area equivalent to 16 bits on the SDRAM 14. If one block is constituted by 16 pixels as described above and the RAW data for one block is stored in the SDRAM 14 without compression, the RAW data occupies an area equivalent to 256 bits. However, in this embodiment, such an occupied storage area can be reduced to 128 bits, and a compression ratio of 50% can be achieved.

Figure 2:
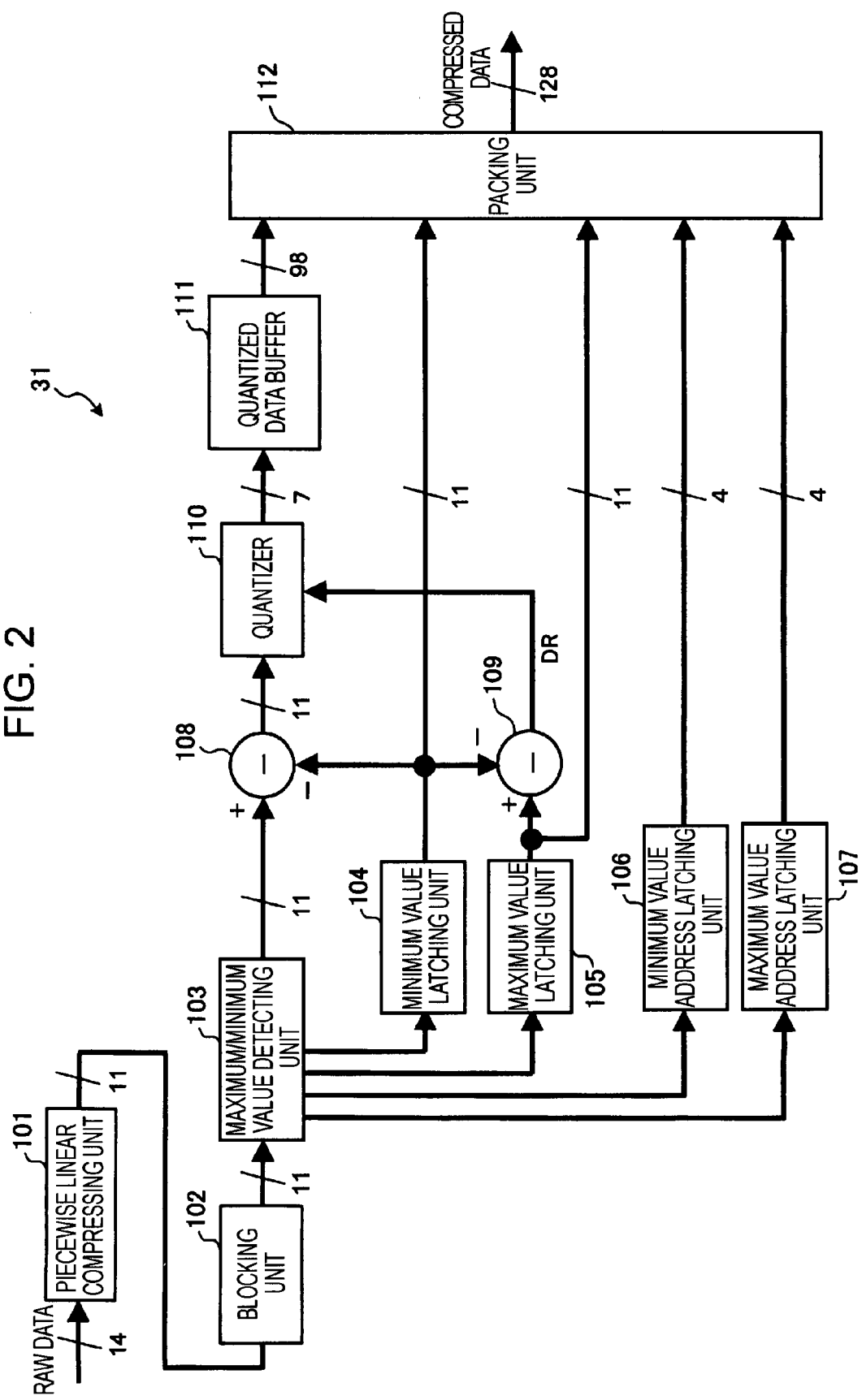
FIG. 2 is a block diagram showing an internal configuration of a RAW compressing section.

FIG. 2 is a block diagram showing an internal configuration of the RAW compressing section.

As shown in FIG. 2, the RAW compressing section 31 has a piecewise linear compressing unit 101, a blocking unit 102, a maximum/minimum value detecting unit 103, a minimum value latching unit 104, a maximum value latching unit 105, a minimum value address latching unit 106, a maximum value address latching unit 107, a subtractors 108 and 109, a quantizer 110, a quantized data buffer 111, and a packing unit 112.

The piecewise linear compressing unit 101 compresses the supplied 14-bit RAW data into 11-bit data using piecewise linear approximation in a nonlinear manner. The piecewise linear compressing unit 101 is provided for a purpose of improving entire compression efficiency by lowering the gradation of the RAW data as much as possible prior to the following compression procedure. For this reason, the piecewise linear compressing unit 101 may be omitted depending on a desired compression ratio. In such a case, an inverse piecewise linear transformation unit provided at an output stage of the RAW decompressing section 32 described below with reference to FIG. 4 has to be omitted as well.

Figure 3:
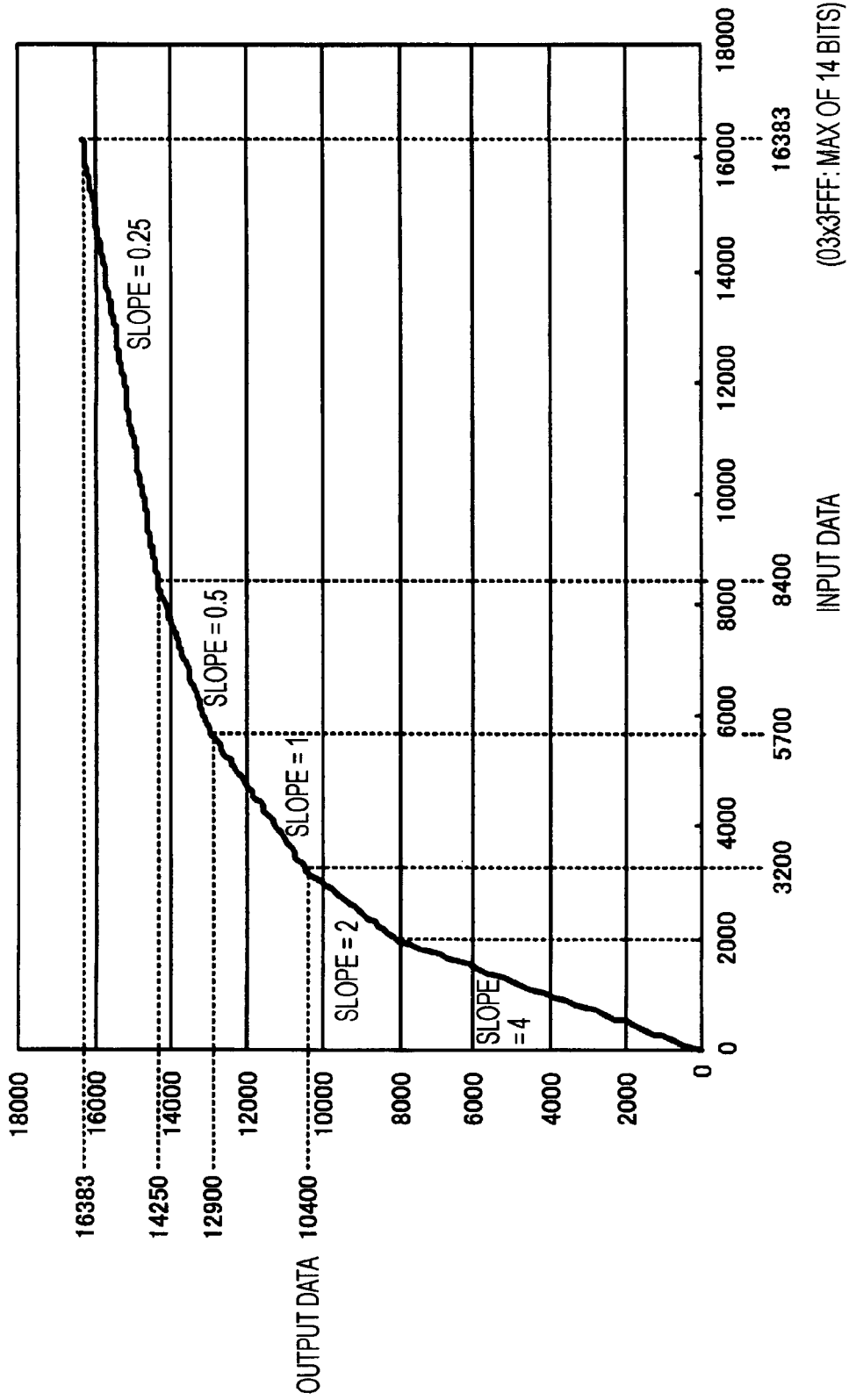
FIG. 3 is a diagram showing an example of a broken line employed by a piecewise linear compressing unit.

FIG. 3 is a diagram showing an example of a broken line employed by the piecewise linear compressing unit.

FIG. 3 shows an example in which the gradation of the input data is converted using a line having five slope values divided by four points. In this example, as the value of the input data becomes smaller, i.e., as the color becomes darker (or the color is paler), higher gradation is assigned in accordance with visibility characteristics of human beings. Such a broken line may be prepared for each color component, for example, and the broken lines may be switched to the corresponding one for each color component of the input pixel data.

After converting the gradation of the input data using such a broken line, for example, the piecewise linear compressing unit 101 divides the value of the converted data by 8 (i.e., shifts the value of the converted data to the right by 3 bits) so as to compress the data into 11-bit data. At this time, the truncated lower bits are rounded, for example. Alternatively, the piecewise linear compressing unit 101 may prepare a ROM table in which the input data and the compressed output data based on the above-described calculation are stored with being associated with each other and perform conversion of the input and output data according to the ROM table.

Referring back to FIG. 2, the description is given below.

The blocking unit 102 divides the data output from the piecewise linear compressing unit 101 into blocks each constituted by 16 pixels of the same color component that are neighboring to each other in a horizontal direction. The blocking unit 102 then outputs the data for each divided block. With this configuration, a correlation between data included in the block becomes stronger, and image degradation caused by the following quantization operation can be reduced.

For example, in a case where imaging devices 11 arranged in the Bayer pattern are used, a line of a repetition of an R component and a Gr component and a line of a repetition of a B component and a Gb component appear alternately. For example, the R components and the Gr components repeatedly appear (R0, Gr0, R1, Gr1, . . . , R15, Gr15) in the data input to the blocking unit 102, the blocking unit 102 changes an output order and divides the data into blocks so that 16 pixels of the same color component continuously appear (R0, R1, R2, . . . , R15, Gr0, Gr1, . . . , Gr15).

The maximum/minimum value detecting unit 103 detects a maximum value and a minimum value in one block. More specifically, the maximum/minimum value detecting unit 103 detects the maximum and minimum values in one block, and addresses indicating positions where the pixels having the maximum and minimum values are located from the first pixel in the block (hereinafter, referred to a maximum value address and a minimum value address). The maximum value address and the minimum value address are detected as an address value ranging from 0 to 15.

In consideration of a case where a plurality of pixels having the same value, which is equivalent to the maximum or minimum value, exist in the block, a following determination rule is prepared for determination of the maximum and minimum values so as to avoid confusion in the compression/decompression operation. Firstly, as an initialization operation of determination of the maximum value, a temporary maximum value is set at a value of 0th pixel. Then, if first to 15th pixels have values equal to or greater than the temporary maximum value, the temporary maximum value is updated by the value of the pixel. Accordingly, the temporary maximum value after the determination of the 15th pixel is determined as the maximum value in the block.

In addition, similarly, as an initialization operation of determination of the minimum value, a temporary minimum value is set at a value of 0th pixel. Then, if first to 15th pixels have values smaller than the temporary minimum value, the temporary minimum value is updated by the value of the pixel. Accordingly, the temporary minimum value after the determination of the 15th pixel is determined as the minimum value in the block.

For example, in a case where leading two pixels (i.e., the 0th pixel and the first pixel) have the same maximum value among 16 pixels, the maximum value address is set at 1. In addition, when all of 16 pixels have the same value, the minimum value address is set at 0, whereas the maximum value address is set at 15.

The maximum/minimum value detecting unit 103 outputs the detected minimum and maximum values to the minimum value latching unit 104 and the maximum value latching unit 105, respectively. The maximum/minimum value detecting unit 103 outputs the minimum value address and the maximum value address to the minimum value address latching unit 106 and the maximum value address latching unit 107, respectively. In addition, the maximum/minimum value detecting unit 103 sequentially outputs each input data included in one block to the subtractor 108 after finishing the determination of the maximum and minimum values in the block.

The minimum value latching unit 104 and the maximum value latching unit 105 latch the minimum value and the maximum value supplied from the maximum/minimum value detecting unit 103, respectively. In addition, the minimum value address latching unit 106 and the maximum value address latching unit 107 latch the minimum value address and the maximum value address supplied from the maximum/minimum value detecting unit 103, respectively. The minimum value latching unit 104, the maximum value latching unit 105, the minimum value address latching unit 106, and the maximum value address latching unit 107 keep latching the input data until the block corresponding to the input data is encoded by the packing unit 112.

The subtractor 108 subtracts the minimum value of the block output from the minimum value latching unit 104 from the data of pixels output from the maximum/minimum value detecting unit 103. This subtraction is equivalent to subtracting a DC offset that is common to the pixels included in one block from the data of each pixel.

The subtractor 109 subtracts the minimum value of the block output by the minimum value latching unit 104 from the maximum value output by the maximum value latching unit 105. The result of the subtraction indicates a dynamic range (DR) used during the quantization.

The quantizer 110 quantizes the data output from the subtractor 108 according to the dynamic range output from the subtractor 109. In this embodiment, the data is quantized at a fixed length of 7 bits, for example.

As the quantizer 110, a configuration of dividing the data output from the subtractor 108 by the dynamic range using an integer divider may be employed, for example. In addition, when a quantization step size is limited to a power of two, a bit shifter that operates in the following manner may be also employed, thereby being able to reduce the size of the circuit. When such a bit shifter is utilized on the compressing side, the size of a circuit for the dequantization can be reduced on the decompressing side as well.

To quantize 11-bit data input from the subtractor 108 to 7-bit data, the following shift operation may be performed, for example.

[$0 \leq DR \leq 127$] The input data is output without any shift operation.

[$128 \leq DR \leq 255$] The input data is shifted to the right by 1 bit.

[$256 \leq DR \leq 511$] The input data is shifted to the right by 2 bits.

[$512 \leq DR \leq 1023$] The input data is shifted to the right by 3 bits.

[$1024 \leq DR \leq 2047$] The input data is shifted to the right by 4 bits.

The quantized data buffer 111 temporarily stores the quantized data for 16 pixels output from the quantizer 110.

The packing unit 112 packs the output data from the quantized data buffer 111, the minimum value latching unit 104, the maximum value latching unit 105, the minimum value address latching unit 106, and the maximum value address latching unit 107 into 128-bit compressed data for each block. When reading out the quantized data for each pixel from the quantized data buffer 111, the packing unit 112 discards the quantized data for the maximum and minimum values on the basis of the data output from the minimum value address latching unit 106 and the maximum value address latching unit 107. The packing unit 112 packs only the quantized data for the rest of 14 pixels in the block as shown in FIG. 4.

Figure 4:
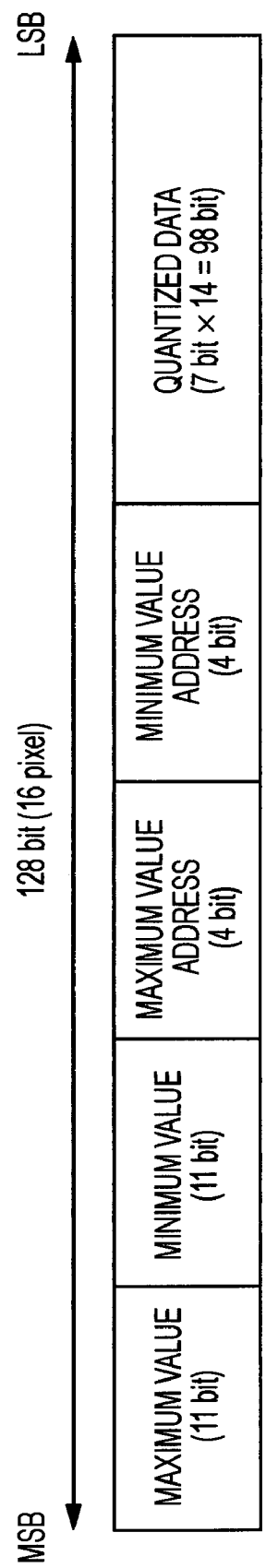
FIG. 4 is a diagram showing a structure of compressed data for one block generated by a packing operation.

FIG. 4 is a diagram showing a structure of the compressed data for one block generated by the packing operation.

As shown in FIG. 4, the compressed data is constituted by the maximum value and the minimum value in the block (11 bits for each), the maximum value address and the minimum value address for these values (4 bits for each), and the quantized data (98 bits) for 14 pixels except for the pixels having the maximum and minimum values.

Since the maximum and minimum values in the block are packed, by packing the maximum and minimum value addresses indicating the positions of the pixels having the maximum and minimum values instead of the quantized data for the maximum and minimum values, the original data can be restored at the time of decompression. Each quantized data occupies 7 bits, whereas the address occupies 4 bits since 4 bits are enough to express 16 addresses. From the difference, in total 6 bits are advantageously reduced regarding the maximum and minimum values. Accordingly, the RAW data for 16 pixels that occupies a 256-bit memory area is compressed by a factor of 2, so that the 128-bit data is obtained.

Figure 5:
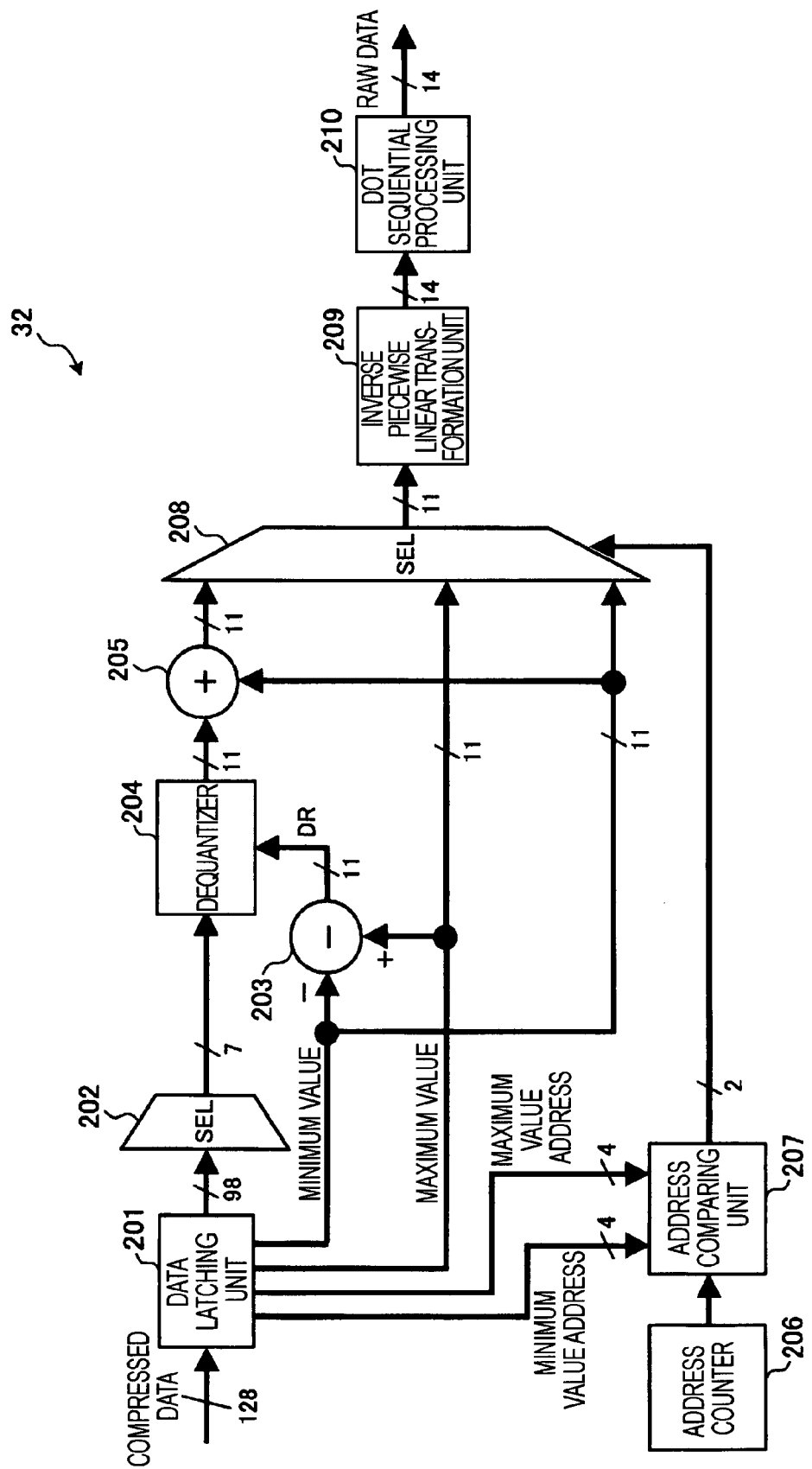
FIG. 5 is a block diagram showing an internal configuration of a RAW decompressing section.

FIG. 5 is a block diagram showing an internal configuration of the RAW decompressing section.

As shown in FIG. 5, the RAW decompressing section 32 includes a data latching unit 201, a selector 202, a subtractor 203, a dequantizer 204, an adder 205, an address counter 206, an address comparing unit 207, a selector 208, an inverse piecewise linear transformation unit 209, and a dot sequential processing unit 210.

The data latching unit 201 latches the 128-bit compressed data read out from the SDRAM 14. The data latching unit 201 keeps latching the input data until the selector 208 finishes processing all of the input data included in block.

The selector 202 receives the quantized data (98 bits) from the data latched by the data latching unit 201. The selector 202 then sequentially selects the 7-bit data, which is equivalent to one pixel, from the received data, and supplies each 7-bit data to the dequnatizer 204.

The subtractor 203 receives the maximum value (11 bits) and the minimum value (11 bits) among the data latched by the data latching unit 201. The subtractor 203 then subtracts the minimum value from the maximum, and outputs the dynamic range.

The dequantizer 204 dequantizes the quantized data for each pixel supplied from the selector 202 according to the dynamic range. In this embodiment, each 7-bit fixed length code is dequantized and 11-bit data is output.

As the dequantizer 204, a configuration of multiplying the quantized data by the dynamic range using an integer multiplier may be employed, for example. In addition, as described above in the description of the quantizer 110, when the data is quantized with the quantization step size being limited to a power of two, a bit shifter may be employed as the dequantizer 204, thereby being able to reduce the size of the circuit. Such a bit shifter operates in the following manner, for example.

[$0 \leq DR \leq 127$] The input data (quantized data) is output without any shift operation.

[$128 \leq DR \leq 255$] The input data is shifted to the left by 1 bit.

[$256 \leq DR \leq 511$] The input data is shifted to the left by 2 bits.

[$512 \leq DR \leq 1023$] The input data is shifted to the left by 3 bits.

[$1024 \leq DR \leq 2047$] The input data is shifted to the left by 4 bits.

The adder 205 adds the data output from the dequantizer 204 and the minimum value latched by the data latching unit 201. By this operation, the DC offset that is common to the data of the pixels included in the block is added to the dequantized data.

The address counter 206 performs a count up operation in synchronization with the output timing of the pixel data so as to generate a count value (0 to 15) corresponding to an order of the pixels in the block.

The address comparing unit 207 receives the maximum value address and the minimum value address among the data latched by the data latching unit 201. The address comparing unit 207 then compares the maximum value address and the minimum value address with the count value supplied from the address counter 206, and outputs a selection signal to the selector 208 when each address value agrees the counter value.

The selector 208 selectively outputs the data supplied from the adder 205 and the maximum and minimum values supplied from the data latching unit 201. More specifically, the selector 208 selectively outputs the maximum value supplied from the data latching unit 201 upon receiving the selection signal for the maximum value address from the address comparing unit 207, whereas the selector 208 selectively outputs the minimum value supplied from the data latching unit 201 upon receiving the selection signal for the minimum value address. In other cases, the selector 208 selectively outputs the data supplied from the adder 205. Accordingly, the 11-bit compressed pixel data of the same color component is decompressed according to the original order of pixels.

The inverse piecewise linear transformation unit 209 decompresses the 11-bit data supplied from the selector 208 into the 14-bit data according to the opposite characteristics employed by the piecewise linear compressing unit 101 of the RAW compressing section 31.

Figure 6:
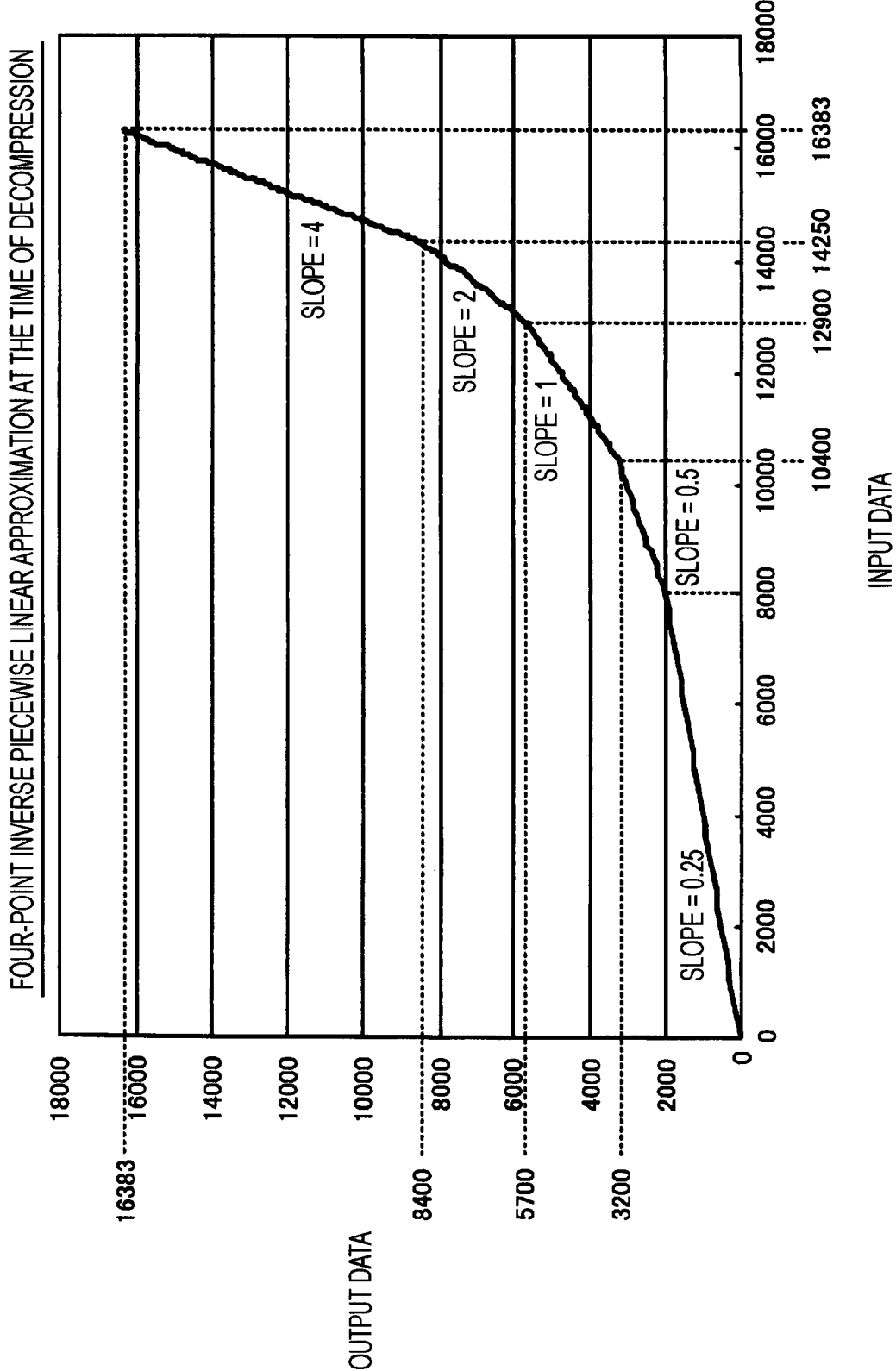
FIG. 6 is a diagram showing an example of a broken line employed by an inverse piecewise linear transformation unit.

FIG. 6 is a diagram showing an example of a broken line employed by the inverse piecewise linear transformation unit.

A broken line shown in FIG. 6 has the characteristics opposite to the broken line, shown in FIG. 3, employed by the piecewise linear compressing unit 101. The inverse piecewise linear transformation unit 209 converts the gradation using the broken line shown in FIG. 6. The inverse piecewise linear transformation unit 209 firstly multiplies the input data by 8 (i.e., shifts the input data to the left by 3 bits) to generate 14-bit data. The inverse piecewise linear transformation unit 209 then converts the gradation of the 14-bit data using the broken line shown in FIG. 6 to decompress the 14-bit pixel data. The inverse piecewise linear transformation unit 209 may prepare a ROM table in which the input data and the decompressed output data are stored with being associated with each other and perform conversion of the input and output data according to the ROM table.

When the data has not undergone the compression performed by the piecewise linear compressing unit 101 at the time of compression, the data conversion performed by the inverse piecewise linear transformation unit 209 is also bypassed at the time of decompression.

Now, referring back to FIG. 5, the description is given below.

The dot sequential processing unit 210 changes the order of the decompressed data into the order of pixels of the original RAW data in a procedure opposite to the procedure for blocking performed by the blocking unit 102 of the RAW compressing section 31, and output the data. For example, when the pixel data are divided into blocks and compressed so that 16 consecutive pixels of the same color component appear (R0, R1, R2, ..., R15, Gr0, Gr1, ..., Gr15), the dot sequential processing unit 210 changes the order of the data so that the R component and the Gr component repeatedly appear alternately (R0, Gr0, R1, Gr1, ..., R15, Gr 15). To change the order, the dot sequential processing unit 210 includes a buffer memory for storing decompressed data for two blocks, and alternately outputs the data of each color component upon completion of buffering the data for two blocks in the buffer memory.

With the RAW compressing section 31 and the RAW decompressing section 32 having the above-described configuration, the fixed length encoding and compressing can be performed by setting the quantization word length for each pixel at a fixed length at the time of compression. Thus, the band for the data to be read and written from and in the SDRAM 14 through the internal bus 28 can be decreased to a predetermined level, and address management to the SDRAM 14 can be simplified.

In addition, the compression ratio is determined by a combination of the number of pixels in one block to be compressed and the quantization word length. The compression ratio can be flexibly set in accordance with a desirable image quality (i.e., an allowable amount of compression distortion), assignment of a transmission band in a bus on which the data is transferred, and a reading/writing capability of the SDRAM 14, etc. For example, in the above-described embodiment, regarding normal natural images, the PSNR after the compressed/decompressed image data is converted into the luminance/color-difference signals can be kept at about 50 dB while the compression ratio is kept at 50% by quantizing the RAW data for 16 pixels at a quantization word length of 7 bits. Thus, the compression distortion can be suppressed at a level not sensible by naked eyes and the image degradation can be substantially prevented.

In addition, since the compression/decompression operation is basically performed in an integrated manner, the line memory used for referring the pixel data in the upper and lower lines is not required, which relatively simplifies the processing. Thus, the size of the circuit for compression/decompression and the manufacturing cost can be suppressed, which advantageously increases the speed of the processing and shortens the processing time.

Therefore, a small image capturing apparatus capable of performing image capturing operations at higher speed and recording/displaying high-quality images can be realized at a relatively low cost.

In addition, the RAW compressing section 31 and the RAW decompressing section 32 having the above-described configuration may be configured to perform variable length encoding by a setting of the quantization word length. For example, at the time of compression, the variable length encoding is performed by changing the quantization word length in accordance with the dynamic range, such that the compression efficiency can be further increased. Moreover, the image degradation can be prevented by using the similar reversible compression method. In this case, the compression/decompression using the broken lines are not performed.

The CPU 25 may flexibly control the settings of the RAW compressing section 31 and the RAW decompressing section 32. For example, the CPU 25 can change the compression ratio by changing the quantization word length and the number of pixel included in one block or by controlling tuning on/off of a piecewise linear compression/decompression function. In addition, the functions of the RAW compressing section 31 and the RAW decompressing section 31 may be configured to be turned on/off. For example, the following control operation can be employed. The compression/decompression function is turned on at the time of continuous shooting, whereas the compression/decompression function is turned off in a mode for recording the RAW data in the storage device 16.

In addition, the RAW compressing section 31 and the RAW decompressing section 32 may be provided between, for example, the SDRAM controller 27 and the internal bus 28 instead of the above-described positions. In such a case, the time for writing and reading the RAW data in and from the SDRAM 14 can be advantageously reduced, and the capacity of the SDRAM 14 can also be advantageously decreased.

Now, a modification of the above-described first embodiment will be described.

Second Embodiment

Figure 7:
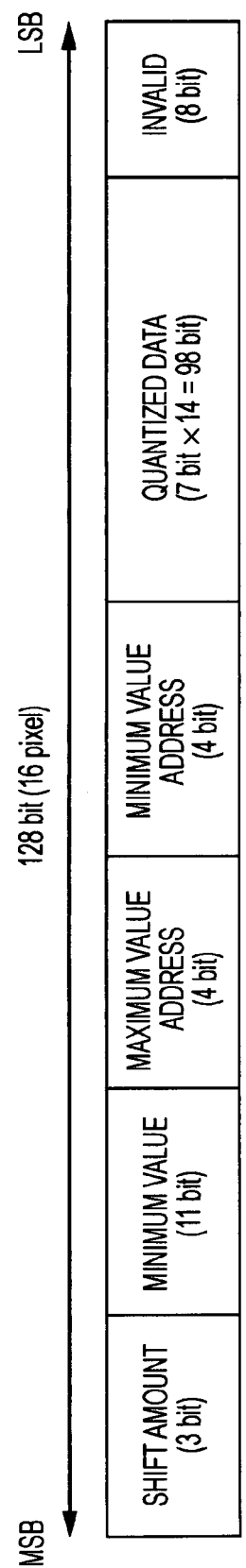
FIG. 7 is a diagram showing a structure of compressed data output by an RAW compressing section in an image capturing apparatus according to a second embodiment of the present invention.

FIG. 7 is a diagram showing a structure of compressed data output by an RAW compressing section in an image capturing apparatus according to a second embodiment of the present invention.

When a quantization step size is set at a power of two in the above-described compression method, a quantizer may be constituted by a bit shifter. In such a case, a shift amount indicates a dynamic range of the block. In addition, it is obvious that all bits of the value obtained by quantizing a maximum value in the block are 1. Thus, a decompressing side can determine quantized data for the maximum value based on the shift amount instead of an absolute value of the maximum value and decompress the quantized data.

Accordingly, as shown in FIG. 7, compressed data contains the shift amount (at least 3 bits in the above-described operation example) employed by the quantizer instead of the maximum value (11 bits). This can reduce the number of bits of the data to be contained in the compressed data. Thus, it is possible to increase the compression ratio or to improve image quality by increasing a quantization word length.

In the example shown in FIG. 7, a bus width of an internal bus 28 is assumed as 64 bits. To adjust the compressed data to the bus width, an 8-bit invalid area is included in the compressed data.

Third Embodiment

Figure 8:
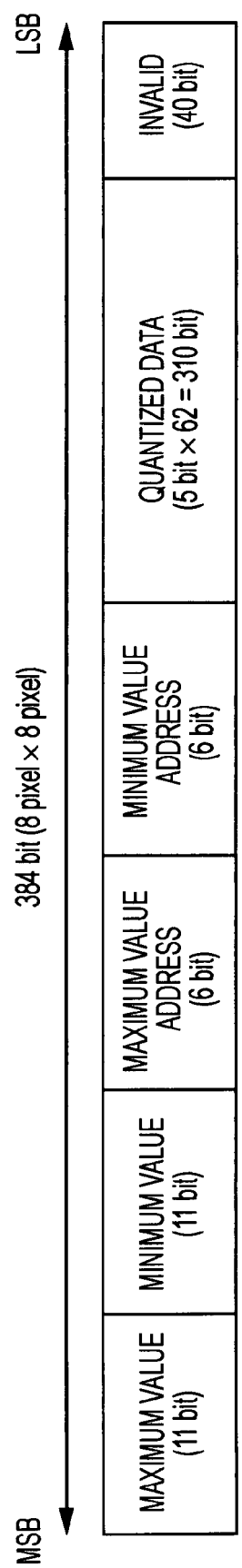
FIG. 8 is a diagram showing a structure of compressed data output by an RAW compressing section in an image capturing apparatus according to a third embodiment of the present invention.

FIG. 8 is a diagram showing a structure of compressed data output by an RAW compressing section in an image capturing apparatus according to a third embodiment of the present invention.

Each of the above-described embodiments shows an example in which RAW data is divided into blocks on a line-by-line basis and compressed. Application of the above compression/decompression method allows the RAW data to be divided into blocks for each rectangular area across a plurality of lines. For example, since pixel data are sequentially scanned in a case where imaging devices, such as CMOS sensors, capable of scanning all pixels (performing progressive scan) are used, a correlation between the pixel data in the vertical direction becomes stronger. Thus, even if the pixels in the rectangular area are gathered in a block, image-quality-degradation-free compression can be performed.

For example, FIG. 8 shows an example of compressed data obtained when pixel data of the same color component in an area of 8 pixels×8 pixels are gathered in a block. Since one block includes data for 64 pixels, lengths of a maximum value address and a minimum value address are set at 6 bits. In addition, in this example, in consideration of the correlation between pixels, a quantization word length is set at 5 bits. Additionally, a bus width of an internal bus is assumed as 64 bits. In accordance with the bus width, a 40-bit invalid area is set in the compressed data, and the compressed data is 384 bits.

For example, when the RAW data for 64 pixels is stored in an SDRAM 14, the RAW data occupies a 1024-bit area on the SDRAM 14. On the other hand, in the example shown in FIG. 8, a 384-bit area is required, and the data is compressed by a factor of 2.6. For example, compressed RAW data for 10 frames can be stored in an area capable of storing noncompressed RAW data for 4 frames.

To gather pixels located across a plurality of line into a block, both the RAW compressing section 31 and the RAW decompressing section 32 require an internal line memory or the like for storing pixel data of the plurality of lines. However, for example, in a case where multichannel imaging devices capable of simultaneously outputting pixel signals from pixels of the same color component for a plurality of lines are used, regarding one block or the like, a line sensor having much less pixels in the horizontal direction than those in one line may be preferably used.

In addition, particularly when the data is gathered in blocks for each rectangular area, the RAW compressing section 31 and the camera signal preprocessing section 21 may be integrated. For example, a defect pixel correction function of the camera signal preprocessing section 21 is for interpolating defect pixel data using data from surrounding pixels when a target pixel is a defect pixel. In addition, the camera signal preprocessing section 21 may have a solitary pixel removal function for correcting a pixel signal having a significantly different level when compared to a value estimated from surrounding pixels. Since such defect pixel correction function and solitary pixel removal function use the line memory in order to utilize the data of the surrounding pixels, these functions has a similarity to a function for detecting a maximum value and a minimum value of the RAW compressing section 31. Thus, at least some of the functions of the RAW compressing section 31 can be included in the camera signal preprocessing section 21 by sharing a line memory.

Fourth Embodiment

Figure 9:
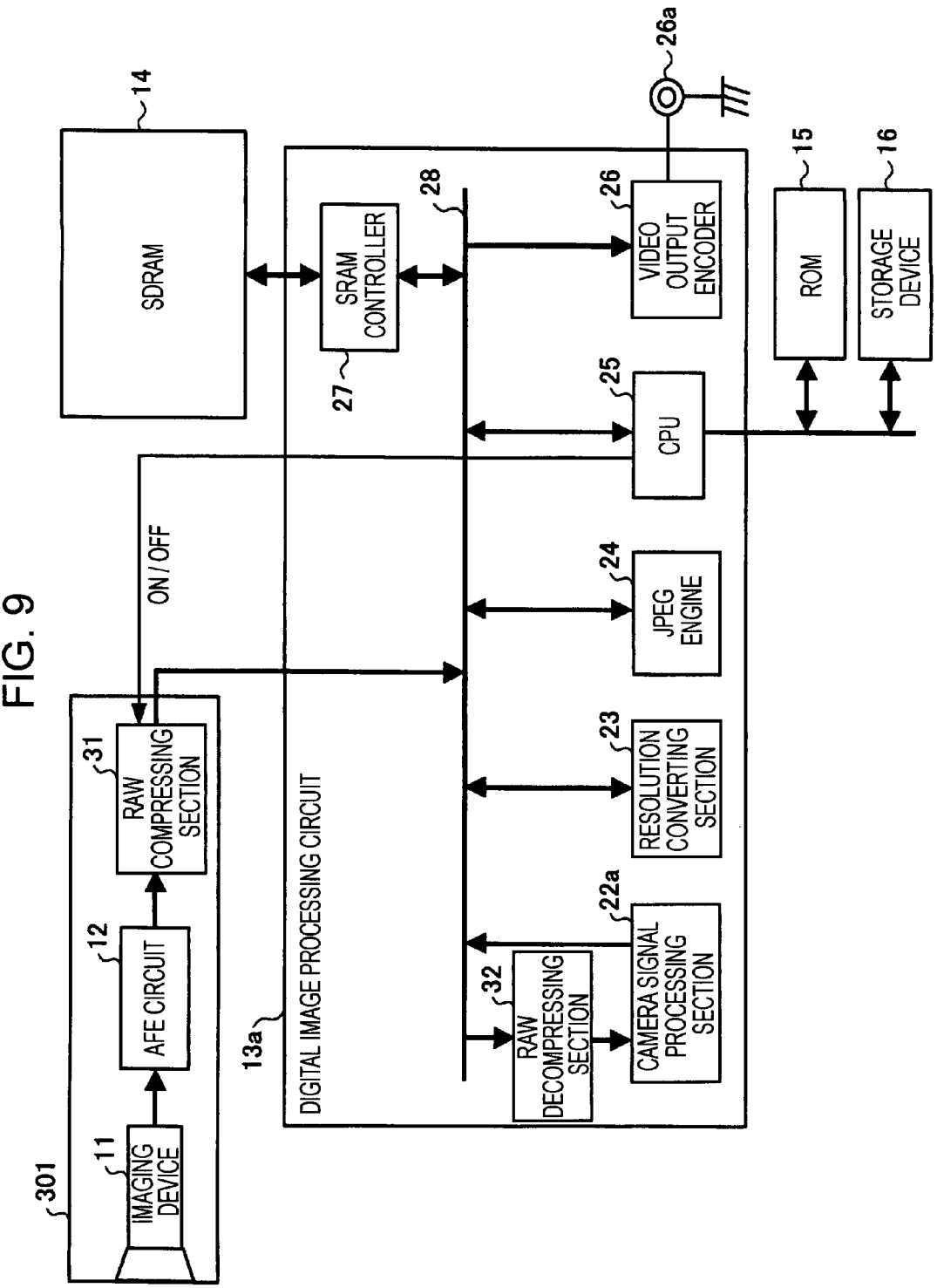
FIG. 9 is a block diagram schematically showing a configuration of an image capturing apparatus according to a fourth embodiment of the present invention.

FIG. 9 is a block diagram schematically showing a configuration of an image capturing apparatus according to a fourth embodiment of the present invention. In FIG. 9, functions corresponding to those shown in FIG. 1 are denoted by the same numerals, and the description thereof is omitted.

An image capturing apparatus shown in FIG. 9 has a sensor LSI (large scale integration) 301 on which imaging devices 11 and an AFE circuit having a sample/hold function and an A/D converting function are formed. In addition, a RAW compressing section 31 is also formed on the sensor LSI 301. Additionally, a camera signal processing section 22a shown in FIG. 9 has functions of the camera signal processing section 22 and the camera signal preprocessing section 21 shown FIG. 1.

Such configurations can advantageously reduce a processing load for writing and reading RAW data in and from an SDRAM 14 and can decrease a RAW data transmission band of an internal bus 28 in a digital image processing circuit 13a as described above. In addition to these advantages, such configurations lower a data transfer frequency from the sensor LSI 301 to the digital image processing circuit 13a, which advantageously allows suppression of power consumption.

Additionally, a radiation from a bus connecting the sensor LSI 301 and the digital image processing circuit 13a can be reduced, which further suppresses an effect of the radiation to internal signals of the sensor LSI 301. Furthermore, a sheet member for preventing the radiation may be made thinner or omitted, which can advantageously make the thickness of the apparatus thinner and the size of the apparatus smaller.

Moreover, in the example shown in FIG. 9, a CPU 25 in the digital image processing circuit 13a is configured to control on/off of functions of the RAW compressing section 31 in the sensor LSI 301. In such a case, tuning on/off of a RAW decompressing section 32 may be controlled by the CPU 25 through an internal bus 28. Such a configuration can realize operations according to the settings. For example, the compression/decompression function is turned on at the time of continuous shooting, whereas the compression/decompression function is turned off in a mode for recording the RAW data in a storage device 16.

In addition to turning ON/OFF, settings of the RAW compressing section 31 may be controlled by the CPU 25 accordingly.

Fifth Embodiment

Figure 10:
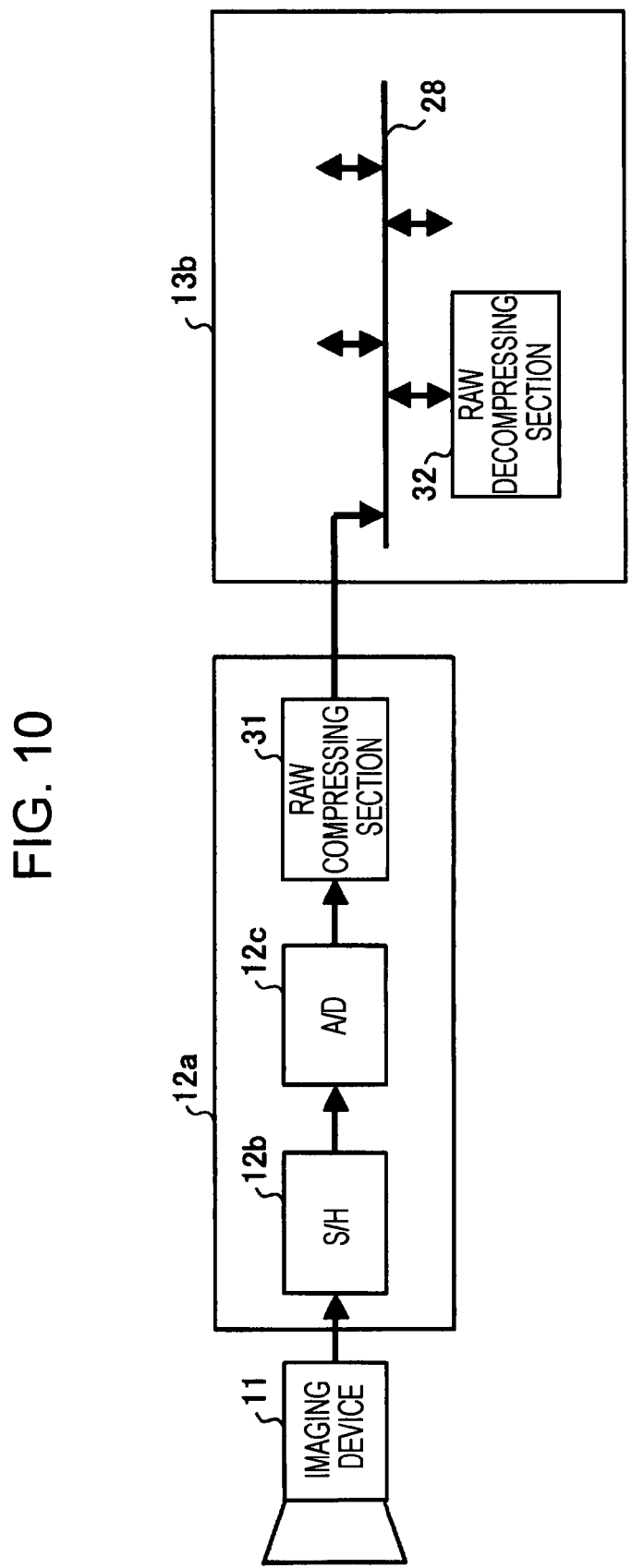
FIG. 10 is a block diagram schematically showing a configuration of an image capturing apparatus according to a fifth embodiment of the present invention.
Figure 11:
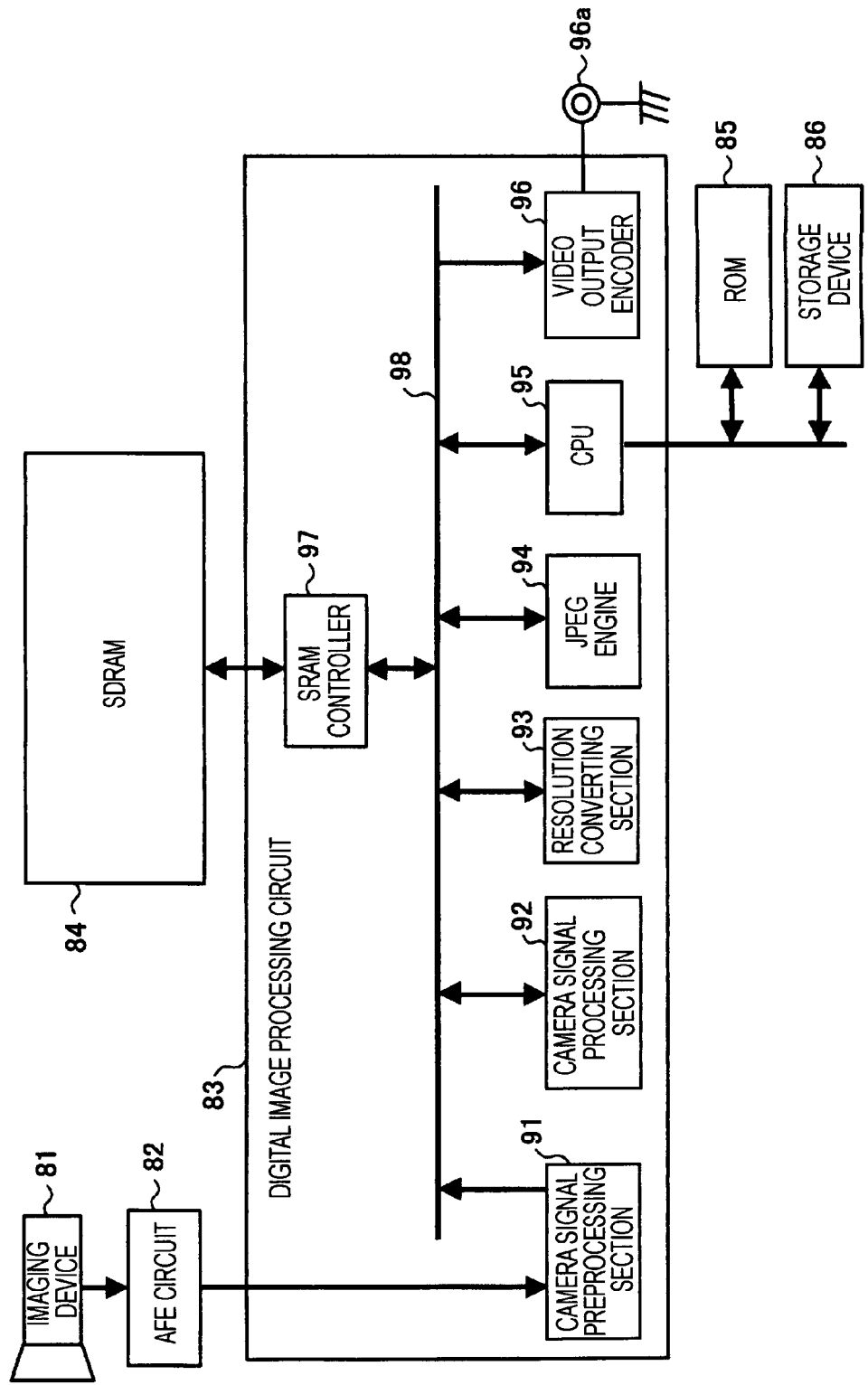
FIG. 11 is a block diagram showing an example of a configuration of a known image capturing apparatus.

FIG. 10 is a block diagram schematically showing a configuration of an image capturing apparatus according to a fifth embodiment of the present invention. In FIG. 10, functions corresponding to those shown in FIG. 1 are denoted by the same numerals, and the description thereof is omitted.

In an image capturing apparatus shown in FIG. 10, a sample/hold section 12b for performing a sampling/holding operation by CDS, an A/D converting section 12c, and a RAW compressing section 31 are formed in an AFE circuit 12a as one chip. As in the case of the example of FIG. 9, a camera signal processing section (not shown) of FIG. 10 has functions of the camera signal processing section 22 and the camera signal preprocessing section 21 shown in FIG. 1.

As in the case of the example of FIG. 9, such configurations can advantageously reduce a processing load for writing and reading RAW data in and from an SDRAM 14 and can decrease a RAW data transmission band of an internal bus 28 in a digital image processing circuit 13b. In addition to these advantages, such configurations decrease a data transfer frequency from the AFE circuit 12a to the digital image processing circuit 13b, which advantageously allows suppression of power consumption and prevents a radiation.

In this embodiment, as in the case of the example of FIG. 9, a CPU (not shown) in the digital image processing circuit 13b is configured to control on/off of functions of the RAW compressing section 31. In addition, settings of the RAW compressing section 31 may be controlled by the CPU accordingly.

It should be understood by those skilled in the art that various modifications, combinations, sub-combinations and alterations may occur depending on design requirements and other factors insofar as they are within the scope of the appended claims or the equivalents thereof.

The invention claimed is:

1. An image capturing apparatus for capturing an image with solid state imaging devices, the image capturing apparatus comprising:
    a compressing section for compressing digitalized data of an image captured with the solid state imaging devices;
    a memory for temporarily storing the compressed image data that is compressed by the compressing section;
    a decompressing section for decompressing the compressed image data that is read out from the memory; and a signal processing section for performing an image quality correction operation on the image data decompressed by the decompressing section, wherein the compressing section generates the compressed image data that contains (i) a maximum value and a minimum value of pixel data in a block constituted by the pixel data from a predetermined number of pixels; (ii) information regarding positions where the maximum value and the minimum value are located in the block; and (iii) quantized data obtained by subtracting the minimum value from each pixel data value of the block, except for the pixel data values of the block corresponding to the maximum value and the minimum value in the block, and then quantizing the results of the subtraction, wherein the quantized data for the block corresponds to a number of pixels equal to two pixels less than the predetermined number of pixels.

2. The apparatus according to claim 1, wherein the compressing section includes a maximum/minimum value detecting unit for detecting, for each block, the maximum value and the minimum value of the pixel data and the information regarding the positions of the maximum value and the minimum value in the block, a quantizing unit for quantizing the results of subtracting the minimum value in the block from each pixel data value in the block according to a dynamic range calculated as a difference between the maximum value and the minimum value in the block, and a packing unit for packing, for each block, the maximum value and the minimum value in the block, the information regarding the positions of the maximum value and the minimum value, and the quantized data except for those corresponding to the maximum value and the minimum value among the data quantized by the quantizing unit so as to generate compressed image data.

3. The apparatus according to claim 2, wherein a quantization word length employed in the quantizing unit is a fixed value.

4. The apparatus according to claim 2, wherein the compressing section further includes a pre-compressing unit for supplying, after converting a gradation of the digitalized image data according to luminosity characteristics of the human eye and decreasing the number of bits of the gradation-converted image data, the image data to the compressing section.

5. The apparatus according to claim 2, wherein the quantizing unit employs a quantization step size of a power of two and quantizes the results of the subtraction with a bit shifter that shifts data to the right by a number of bits corresponding to the dynamic range.

6. The apparatus according to claim 5, wherein the packing unit packs a shift amount employed by the bit shifter instead of the maximum value in the block.

7. The apparatus according to claim 2, wherein the decompressing section includes a dequantizing unit for dequantizing the quantized data extracted from the compressed image data for each block according to the dynamic range calculated as a difference between the maximum and minimum values extracted from the compressed image data, an adding unit for adding the minimum value to the data dequantized by the dequantizing unit, and an output controlling unit for outputting the maximum value, the minimum value, and the values output from the adding unit in the order that the values of the original pixel data have been input to the compressing section on the basis of the information regarding the positions of the minimum and maximum values that is extracted from the compressed image data for each block.

8. The apparatus according to claim 7, wherein the compressing section further includes a pre-compressing unit for supplying, after converting a gradation of the digitalized image data according to luminosity characteristics of the human eye and decreasing the number of bits of the gradation-converted image data, the image data to the compressing section, and wherein the decompressing section further includes a post-decompressing unit for decompressing the image data output from the output controlling unit in a procedure opposite to that employed by the pre-compressing unit.

9. The apparatus according to claim 7, wherein the quantizing unit of the compressing section employs a quantization step size of a power of two and quantizes the results of the subtraction with a bit shifter that shifts data to the right by a number of bits corresponding to the dynamic range, and wherein the dequantizing unit of the decompressing section dequantizes the quantized data extracted from the compressed image data with a bit shifter that shifts data to the left by a number of bits corresponding to the dynamic range.

10. The apparatus according to claim 1, wherein the block is constituted by the pixel data of the same color component.

11. The apparatus according to claim 1, wherein the block is constituted by the pixel data contained in a rectangular area on a captured image.

12. The apparatus according to claim 1, wherein the decompressing section and the signal processing section are connected to the memory through a common bus, and wherein the image data decompressed by the decompressing section is supplied to the signal processing section directly and not through the bus.

13. The apparatus according to claim 12, wherein the compressing section writes the compressed image data in the memory through the bus.

14. The apparatus according to claim 1, wherein the compressing section is formed on the same chip as a circuit for performing digitalizing of the image data.

15. The apparatus according to claim 14, wherein the compressing section is formed on the same chip as the solid state imaging devices as well as the circuit for performing digitalizing of the image data.

16. The apparatus according to claim 14, wherein a function of the compressing section is controlled to be turned on and off by an external control circuit.

17. An imaging circuit used for capturing an image, the imaging circuit comprising:

solid state imaging devices each for converting an incident light into an electric signal;

a digitalizing circuit for digitalizing the imaging signals generated by the solid state imaging devices; and a compressing circuit for compressing an image signal supplied from the digitalizing circuit, wherein the solid state imaging devices, the digitalizing circuit, and the compressing circuit are formed on the same chip, and wherein the compressing circuit includes a maximum/minimum value detecting circuit for detecting, for each block constituted by pixel data of a predetermined number of pixels, a maximum value and a minimum value of the pixel data and information regarding positions where the maximum value and the minimum value are located in the block, a quantizing circuit for quantizing results of subtracting the minimum value in the block from each pixel data value in the block according to a dynamic range calculated as a difference between the maximum value and the minimum value in the block, so as to generate quantized data, and a packing circuit for packing, for each block, (i) the maximum value and the minimum value in the block; (ii) the information regarding the positions of the maximum value and the minimum value; and (iii) the quantized data except for those data of the quantized data corresponding to the maximum value and the minimum value among the data of the block quantized by the quantizing circuit, wherein the quantized data that is packed for the block corresponds to a number of pixels equal to two pixels less than the predetermined number of pixels, so as to generate compressed image data.

18. An image capturing method for capturing an image with solid state imaging devices, the method comprising:

causing a compressing section to generate compressed image data that contains (i) a maximum value and a minimum value of pixel data in a block constituted by pixel data from a predetermined number of pixels, (iii) information regarding positions where the maximum value and the minimum value are located in the block, and (iii) quantized data obtained by subtracting the minimum value from each pixel data value of the block, except for the pixel data values of the block corresponding to the maximum value and the minimum value in the block, and then quantizing the results of the subtraction on the basis of digitalized data of an image captured with the solid state imaging devices, wherein the quantized data for the block corresponds to a number of pixels equal to two pixels less than the predetermined number of pixels, and to temporarily store the compressed image data in a memory;

causing a decompressing section to read out the compressed image data stored in the memory and to decompress the compressed image data; and causing a signal processing section to perform an image quality correction operation on the image data decompressed by the decompressing section.

* * * * *